United States Patent
Hansen et al.

(10) Patent No.: US 9,475,677 B2
(45) Date of Patent: Oct. 25, 2016

(54) METHOD OF HANDLING WIND TURBINE BLADES AND DEVICE FOR MOUNTING WIND TURBINE BLADES, IN PARTICULAR MOUNTING BLADES ON A WIND TURBINE

(75) Inventors: Henrik Lynderup Hansen, Moldrup (DK); Jesper Moeller, Esbjerg (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 2207 days.

(21) Appl. No.: 11/986,036

(22) Filed: Nov. 19, 2007

(65) Prior Publication Data
US 2009/0025219 A1    Jan. 29, 2009

(30) Foreign Application Priority Data

Nov. 23, 2006  (EP) ...................................... 06024336
Nov. 23, 2006  (EP) ...................................... 06024337
Jul. 12, 2007   (EP) ...................................... 07013725

(51) Int. Cl.
| | |
|---|---|
| *B66C 1/00* | (2006.01) |
| *B66C 1/42* | (2006.01) |
| *B66C 1/10* | (2006.01) |
| *B66C 23/36* | (2006.01) |

(Continued)

(52) U.S. Cl.
CPC . *B66C 1/42* (2013.01); *B66C 1/00* (2013.01); *B66C 1/108* (2013.01); *B66C 23/36* (2013.01); *F03D 1/001* (2013.01); *F03D 11/04* (2013.01); *F05B 2230/61* (2013.01); *Y02E 10/721* (2013.01); *Y02E 10/726* (2013.01); *Y02E 10/728* (2013.01); *Y02P 70/523* (2015.11); *Y10T 29/49316* (2015.01); *Y10T 29/53991* (2015.01)

(58) Field of Classification Search
USPC .......................... 294/67.1, 67.3, 67.4, 67.41
See application file for complete search history.

(56) References Cited

U.S. PATENT DOCUMENTS

| | | | |
|---|---|---|---|
| 3,858,728 A | 1/1975 | Fathauer | |
| 4,073,531 A | 2/1978 | Androski | |
| 4,293,155 A | 10/1981 | Grant | |

(Continued)

FOREIGN PATENT DOCUMENTS

| | | |
|---|---|---|
| CN | 1688808 A | 10/2005 |
| DE | 2029985 A1 | 1/1971 |

(Continued)

OTHER PUBLICATIONS

James F. Manwell, John MacLeod, Sally Wright, Lynn DiTullio, Jon McGowan: "Hull Wind II: A case study of the Development of a Second Large Wind Turbine Installation in the Town of Hull, MA", American Wind Energy Association Windpower 2006 Conference; Book; 2006; pp. 1-20.

(Continued)

*Primary Examiner* — Sang Kim
*Assistant Examiner* — Juan Campos, Jr.

(57) ABSTRACT

A method for handling a wind turbine blade and mounting said blade on a wind turbine hub located at a nacelle at the top of a wind turbine tower is described. The wind turbine blade is lifted with a lifting system for handling wind turbine blades, in doing so said wind turbine blade is oriented in a substantially horizontal position. The wind turbine blade is fixed in the substantially horizontal position to the wind turbine hub. The lifting device is released from the blade using a remote control unit. The lifting device is further on removed from the blade.

14 Claims, 2 Drawing Sheets

(51) Int. Cl.
   *F03D 1/00*       (2006.01)
   *F03D 11/04*      (2006.01)

(56) References Cited

U.S. PATENT DOCUMENTS

| | | | |
|---|---|---|---|
| 4,416,480 A | | 11/1983 | Moody |
| 4,818,004 A | * | 4/1989 | Oswalt et al. ............... 294/81.3 |
| 5,772,269 A | * | 6/1998 | Henning et al. ........... 294/67.22 |
| 5,895,083 A | * | 4/1999 | Bidwell ......................... 294/75 |
| 8,595,931 B2 | * | 12/2013 | Riddell .................. B66C 1/108 |
| | | | 29/889.6 |
| 2005/0019166 A1 | | 1/2005 | Bervang |
| 2005/0242602 A1 | | 11/2005 | Protesto |
| 2006/0087137 A1 | | 4/2006 | Mongan |
| 2006/0120809 A1 | | 6/2006 | Ingram et al. |
| 2006/0147308 A1 | | 7/2006 | Wobben |
| 2006/0175465 A1 | | 8/2006 | Teichert |
| 2008/0216301 A1 | * | 9/2008 | Hansen et al. .................. 29/428 |
| 2010/0018055 A1 | * | 1/2010 | Lynderup et al. .............. 29/889 |
| 2012/0027561 A1 | * | 2/2012 | Riddell .................. B66C 1/108 |
| | | | 414/800 |

FOREIGN PATENT DOCUMENTS

| | | |
|---|---|---|
| DE | 2741218 A1 | 3/1978 |
| DE | 3137790 C1 | 2/1983 |
| DE | 3222819 C1 | 11/1983 |
| DE | 3419363 A1 | 11/1985 |
| DE | 241583 A1 | 12/1986 |
| DE | 4423335 A1 | 1/1996 |
| DE | 19942758 A1 | 5/2000 |
| DE | 20109835 U1 | 1/2002 |
| DE | 10305543 B4 | 12/2004 |
| DE | 202004016460 U1 | 1/2005 |
| EP | 1266848 A2 | 12/2002 |
| EP | 1286908 | 3/2003 |
| JP | 2171405 A | 7/1990 |
| JP | 3-23189 A * | 1/1991 |
| JP | 2005255583 A | 9/2005 |
| JP | 2005527739 T | 9/2005 |
| JP | 2006515043 T | 5/2006 |
| WO | 9006277 A1 | 6/1990 |
| WO | 0179107 A1 | 10/2001 |
| WO | 03100248 A1 | 12/2003 |
| WO | 03100249 A1 | 12/2003 |
| WO | 03104645 A1 | 12/2003 |
| WO | 2004022970 A1 | 3/2004 |
| WO | 2004070203 A2 | 8/2004 |
| WO | 2005071261 A1 | 8/2005 |
| WO | 2006061806 A2 | 6/2006 |

OTHER PUBLICATIONS

Wind Blatt, Das Enercon Magazin: "Doppelter Einsatz: Prototyp der E-112 in Kran-Tandemhtiben errichtet", Ausgabe May 2002; Book; 2002; pp. 1-5.
WorldCargo news: "Remote Control for a Crawler Crane", Nov. 2004 edition, p. 3; Magazine; 2004.
Windpower Update Newsletter from Nordex No. 18, dated Nov. 2004, picture 5 on p. 13; Magazine; 2004.
Windkraftanlagen, Erich Hau: "Kapitel 18: Planung, Errichtung and Betrieb", 3rd edition; Book; 2003; 18.1-18.9.3.
Vestas Document disclosing instructions to installation engineers, entitled "Mounting of Individual Blades, Vertically"; Others; 2005; pp. 1-21.
Photo of horizontal blade installation in Boone North Carlina (May 1, 1979), NASA, MOD-1, Wind Turbine; Book; 5 pgs.
Wind-Kraft & Natürliche Energien: "Multi-Mega-Watt: N80 I 2,5 MW Nordex", Ausgabe Jan. 2000, Seiten 12-15; Magazine; 2000; pp. 12-15.
Wind-Kraft & Natürliche Energien Journal: "Bearings for the world 40,000 jobs in 130 countries", Spezialausgabe 2003,; Magazine; pp. 37-40.
Wind-Kraft & Natürliche Energien Journal, Ausgabe Mar. 2002, Deckblatt; Book; pp. 41.
Wind-Kraft & Natürliche Energien Journal, Die neue Spezialausgabe, Deckblatt und 5 Seiten; Magazine; pp. 42-46.
Wind Blatt, Das Enercon Magazin, Ausgabe May 2002, Deckblatt und Seiten 2-6; Magazine; pp. 47-52.
Wind-Kraft & natürliche Energien Journal, Ausgabe Apr. 2002, Deckblatt, Beschreibungsseite 3 und 28-31; Magazine; pp. 53-58.
Sonne Wind & Wärme: "Giganten im Test", Aug. 2003, Seiten 80, 82; Book; pp. 26-27.
WindBlatt, ENERCOn Magazin für Windenergie Ausgabe Mar. 2008; Book; pp. 31-46.
Bilder vom Aufbau der E 70 bei Bergertshofen, Oct. 2006; Book; pp. 47-50.

* cited by examiner

METHOD OF HANDLING WIND TURBINE BLADES AND DEVICE FOR MOUNTING WIND TURBINE BLADES, IN PARTICULAR MOUNTING BLADES ON A WIND TURBINE

CROSS REFERENCE TO RELATED APPLICATIONS

This application claims priority of European Patent Office application No. 06024336.7 EP filed Nov. 23, 2006, of European Patent Office application No. 06024337.5 EP filed Nov. 23, 2006, and of European Patent Office application No. 07013725.2 EP filed Jul. 12, 2007, all of the applications are incorporated by reference herein in their entirety.

FIELD OF INVENTION

The invention relates to methods for handling wind turbine blades and mounting said blades on a wind turbine. The invention further relates to a wind turbine blade lifting device as well as to a wind turbine blade lifting system.

BACKGROUND OF INVENTION

Modern wind turbines usually comprise a rotor with considerable diameter and width. Mounting a wind turbine could include the steps of transporting the different elements to the site of the wind turbine, assembling the tower sections and the tower, lifting the wind turbine nacelle with a crane and mounting the nacelle on the top of the tower, assembling the wind turbine rotor on the ground, lifting the wind turbine rotor with a crane and mounting the rotor to a low speed shaft extending from the nacelle.

The usual way comprises a number of difficulties which have become more and more severe with the increasing size and width of the wind turbine rotor. In particular, assembly of the wind turbine rotor on the ground is difficult as it requires a large area to be free of obstacles which is substantially horizontal and stable in order to be accessible for the assembly workers and the crane. Furthermore, lifting the rotor to the nacelle is rather complicated as the rotor must be turned by 90° in midair. In other lifting systems it is known to pre-mount the wind turbine hub on the nacelle and then lift each wind turbine blade successively to position it next to the hub and perform the mounting of the blades. Such a system is, for example, described in US 2006/0120809 A1 where the blades are mounted in horizontal orientation, and in US 2006/0147308 A1 where the blades are mounted in vertical orientation. A gripping device for lifting wind turbine blades in a vertical orientation which comprises two clamping jaws is disclosed in US 2005/0019166 A1.

In such systems it is often difficult to release a lifting device from the blade once the blade was mounted to the rotor hub. Some systems require that personnel ascend the lifting device and manually disengage the device from the blade. Other systems rely on the blade being kept in place in lifting the lifting device purely by gravity. After mounting the blade on the rotor hub the device is lowered so that it can be released from the blade width and is then moved horizontally towards the blade tip until it is free of the blade. This requires very skilled crane operation, however, and when carrying out the installation during high wind damage to the blade may occur.

SUMMARY OF INVENTION

Considering this prior art, it is an objective of the present invention to provide an improved method of handling a wind turbine blade and mounting said blade on a wind turbine hub. It is a further objective to provide an advantageous wind turbine blade lifting device and an advantageous wind turbine blade lifting system.

The first objective is solved by a method of handling a wind turbine blade and mounting said blade on the wind turbine hub as claimed in an independent claim. The second objective is solved by a wind turbine blade lifting device as claimed in a further independent claimand by a wind turbine blade lifting system as claimed. The depending claims contain further developments of the invention.

The inventive method of handling a wind turbine blade and mounting said blade on a wind turbine hub located at a nacelle at the top of a wind turbine tower comprises the steps of a) lifting the wind turbine blade with a lifting system for handling wind turbine blades, in doing so said wind turbine blade being oriented in a substantially horizontal position; b) fixing the wind turbine blade in the substantially horizontal position to the wind turbine hub; c) releasing the lifting device from the blade using a remote control unit; and d) removing the lifting device from the blades. In particular, the orientation of the blade may be kept in a substantially horizontal direction after the blade is lifted off the ground. Keeping the blade in a substantially horizontal direction during installation can be realised by control wires by which the orientation of the blade can be influenced. In addition, the method may further include, as a preceding step, a step of lifting a wind turbine hub to a nacelle of a wind turbine with a lifting system and mounting the hub on the nacelle or lifting the wind turbine hub and the nacelle together with a lifting system and mounting the nacelle including the hub on a wind turbine tower.

With the inventive method it becomes possible to handle and mount a wind turbine blade in an advantageous manner. Since during lifting the blade from the ground and mounting the blade to the hub the blade is in a substantially horizontal position it is not necessary to turn the blade during the lifting process. Moreover, since releasing the lifting device from the blade is done by using a remote control unit it is not necessary for personnel to ascend to the lifting device to manually disengage the device from the blade.

For performing the method a remotely controllable and releasable lifting device may be used for orienting as well as for fixing the blade during installation.

An inventive wind turbine blade lifting device comprises a lifting frame for receiving a wind turbine blade and a clamping device with a remotely controllable release mechanism. The remotely controllable release mechanism may, in particular, be used for releasing a wind turbine blade from the lifting frame once it is installed on a wind turbine hub. The remotely controllable release mechanism facilitates the dismounting of the lifting device from a wind turbine blade once it is fixed to the hub as no personnel need to ascend to the lifting device.

In the inventive lifting device the clamping device may comprise a seat arranged at the frame which is designed such that a wind turbine blade can be pressed towards it with its trailing edge, its leading edge, its pressure side or its suction side. It then further comprises at least one belt or strap which is designed such that it can be wound around the blade and fixed to the frame. The flexibility of a belt or strap offers the possibility of using the same lifting device for various kinds of turbine blades which may vary, e.g. in thickness and/or cord length.

The clamping device may further comprise a gripping arrangement which is arranged and designed for gripping at least one end of the at least one belt so as to fix the end to the frame. In addition, the clamping device may comprise a tightening arrangement which is arranged and designed for tightening the at least one belt so as to press the blade towards the seat. In particular, one end of the at least one belt may be permanently fixed to the frame at one side of the seat and the tightening arrangement may be located at the other side of the seat. The gripping arrangement may, in particular, be part of the tightening arrangement. Furthermore, the tightening arrangement may be part of the release mechanism. The release mechanism may comprise a mechanism for releasing the tightening action of the tightening arrangement. In this case dismantling the lifting device from the blade can be realised by just letting the at least one band or strap slip out of the gripping arrangement. Complicated constructions in the release mechanisms are not necessary.

The lifting device may be lowered onto the blade while the blade is resting on the ground. Then the frame will be attached to the blade using the belt or belts that is/are, for example, permanently attached to the frame on one side. From the side of the blade at which the belt is attached to the frame the belt may run below the lower part of the blade and then be clamped in the release mechanism on the frame side which is located at the other side of the blade. After tightening the belt or belts (in case two or more belts are used) the blade is securely fixed to the lifting device and can be lifted by the use of a crane.

When the release mechanism comprises a remote control unit for remotely controlling the release of the tightening action the belt or belts can be loosened by the remote control so that the side of the belt which has been gripped by the gripping arrangement can slip out. As a consequence, the lifting device can be easily lifted off the blade when the blade is in a horizontal position. The release mechanism can be remotely controlled by the crane operator by suitable means, e.g. hydraulically, electrically, by wire pull, etc. The ability to remotely release the lifting device once the blade is fitted to the rotor hub is advantageous as it eliminates any need for personnel to ascend the lifting device at great height. Compared to systems where the blade is resting in the lifting device purely by gravity, the demanding lowering and horizontal movement of the lifting device is eliminated.

The tightening arrangement may be an independent device or it may be part of the release mechanism.

It is particularly advantageous if the clamping device comprises at least two belts or straps which are designed such that they can be wound around the blade and fixed to the frame. Pressing the blade to the seat at two different locations offers the opportunity to use bands or straps which may have a considerably smaller width than with using only one band or strap. One band or strap needs to be sufficiently broad in order to ensure that the blade does not tilt towards a vertical orientation during the lifting process.

An inventive wind turbine blade lifting system comprises an inventive wind turbine blade lifting device and a crane boom. The lifting device is connected to the crane boom via control wires for controlling the blade orientation in a substantially horizontal position when it has been lifted off the ground. It may, in particular, further comprise a holding wire which bears the main part of the blade's weight when it is lifted off the ground.

BRIEF DESCRIPTION OF THE DRAWINGS

Further features, properties and advantages of the present invention will become clear from the following description of an embodiment of the invention in conjunction with the accompanying drawings.

DETAILED DESCRIPTION OF INVENTION

Figure 1:
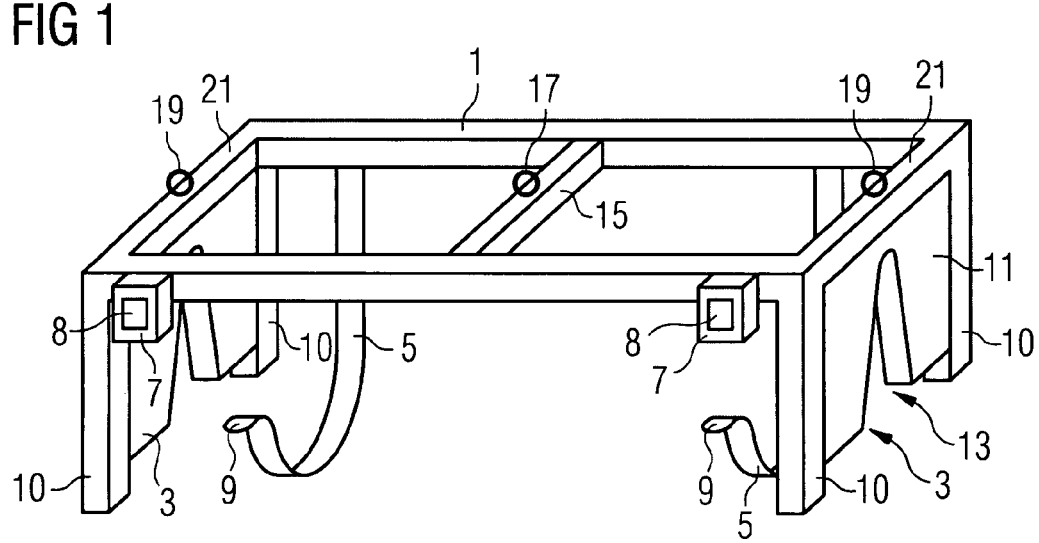
FIG. 1 shows an embodiment of the inventive wind turbine blade lifting device.
Figure 2:
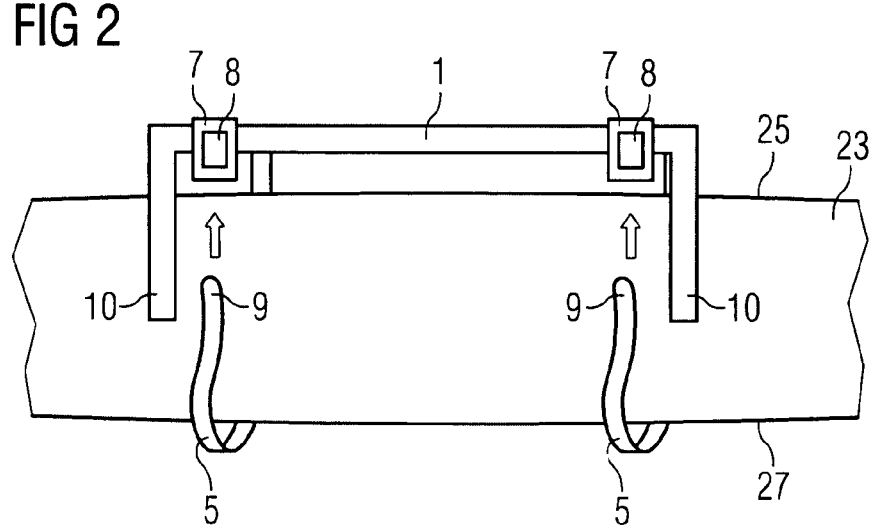
FIG. 2 shows attaching a wind turbine blade to the lifting device.

An inventive wind turbine blade lifting device will now be described with respect to FIG. 1. The lifting device comprises a lifting frame 1 with a clamping device and a remotely controllable release mechanism. The clamping device comprises two seats 3 which are designed such that a turbine blade 23 can be pressed towards it with its trailing edge 25 (FIG. 2). It further comprises two belts 5 which are located at the frame 1 close to the seats 3 and which can be wound around the wind turbine blade 23 after the frame is lowered to the blade 23 with the seats 3 on the blade's trailing edge 25. One end of each belt 5 is permanently fixed to the frame 1 while the other end can be fitted into a combined gripping and tightening arrangement 7 which is fixed to the frame 1 on the side of the frame 1 which is opposite the side to which the belts are permanently fixed. For securing the blade 23 to the frame 1, the loose ends 9 of the belts 5 are inserted into the gripping and tightening arrangement 7 where they are then tightened and secured against slipping out. In the present embodiment the gripping and tightening arrangement 7 is realised as a remotely controllable ratchet device which can, in particular, be unlocked by a remote action so that the ends 9 of the belts 5 can easily slip out of the ratchet mechanism, i.e. out of the gripping and tightening arrangement 7. The remote control unit for remotely unlocking the ratchet mechanism 7 is indicated by block 8 in FIGS. 1 and 2.

The seats 3 are realised by a flexible element 11, e.g. rubber elements, located between legs 10 of the frame 1. They have openings 13 which are adapted to the shape of the trailing edge 25 of the wind turbine blade 23 to be lifted. However, the seats could, in principle, instead have openings which are adapted to the shape of the blade's leading edge, its pressure side or its suction side.

At a central crossbar 15 of the frame 1 a ring 17 is mounted to which a wire 33 (FIG. 4) for bearing the weight and the lifting device and the blade attached thereto can be fixed. Second rings 19 are present at outer crossbars 21 of the frame 1 to which control wires (31) can be fixed for controlling the orientation of a blade attached to the lifting device.

Figure 3:
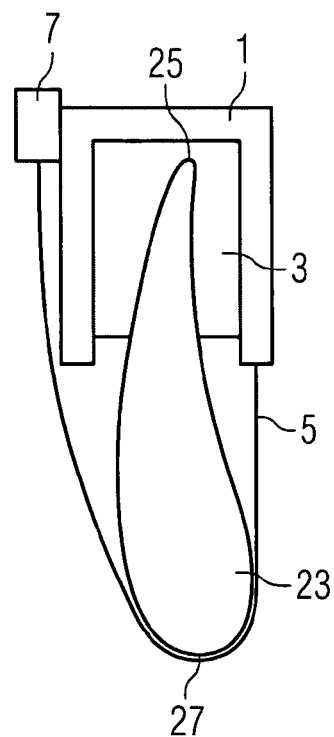
FIG. 3 shows a wind turbine blade attached to the lifting device.

The lifting device is attached to a wind turbine rotor blade 23 when the blade 23 rests on the ground. The blade 23 rests such that its trailing edge 25 shows upwards. After lowering the frame such that the flexible elements 11 come to a rest on the blade's trailing edge 25 the belts 5 are wound around the blade's leading edge 27, then the loose ends 9 of the belts 5 are introduced into the ratchet mechanism 7 and then the belts 5 are tightened. At the same time the ratchet mechanism locks so as to prevent the belts 5 from slipping out of the ratchet mechanism if not an explicit release or unlocking operation is performed by remote control. Hence, the blade 23 is firmly fixed to the frame 1 of the lifting device by tightening of the belts or straps. The tightening arrangement may be independent, or it may be part of the release mechanism, as it is in the present embodiment. FIG. 3 shows a section through the wind turbine blade 23 after it has been attached to the lifting device.

Figure 4:
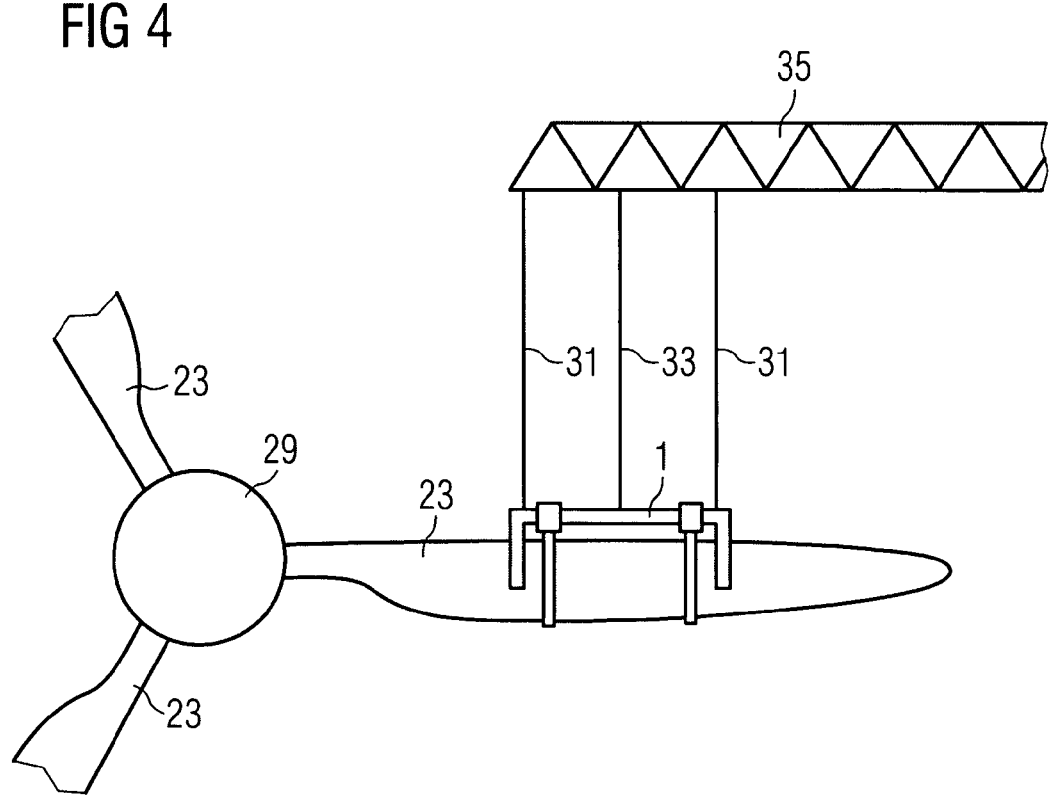
FIG. 4 shows the mounting of a wind turbine blade to a rotor hub of a wind turbine.

FIG. 4 shows a wind turbine blade 23 when it is being mounted on a rotor hub 9 of a wind turbine. The blade 23 which is shown to be mounted to the hub 29 in FIG. 4 is the last blade of the rotor to be mounted. When mounting the blade the rotor hub is rotated such that the blade 23 can be mounted in a horizontal position. By mounting the blade in a horizontal position it is not necessary to rotate the blade during lifting it to the hub 29. During the lifting process the horizontal orientation of the blade can be controlled by control wires 31 which are fixed to the rings 19 at the outer crossbars 21 of the frame 1. The weight of the blade 23 and the lifting device are carried by a central holding wire 33 which is fixed to the ring 17 at the central crossbar 15 of the frame 1. All three wires are carried by a crane boom 35 which is used to lift the blade off the ground and to bring it into a position which is suitable for mounting it on the rotor hub 29.

After the rotor blade 23 is fixed to the rotor hub 29 a remote control signal is sent to the remotely controllable ratchet mechanism 7 for unlocking it so as to release the gripping and tightening force of the ratchet mechanism 7. After releasing these forces the belts 5 to slip out of the ratchet mechanisms 7 and the frame 1 can easily be lifted off the blade 23. Even if the belts 5 do not fully slip out of the ratchet mechanisms 7 after the unlocking control signal has been sent they will do so when the frame 1 is lifted off the blade since they are no longer held by the ratchet mechanism 7. The control signal may be sent by the crane operator which has the advantage that the whole dismounting action is controlled by a single person so that no coordination between different persons is necessary. However, it would also be possible that the release control signal is sent by another person, for example the person who is responsible for fixing the blade to the hub 29.

Although a special embodiment has been described with respect to the figures, deviations of this embodiment are possible. For example, the number of belts is not restricted to two. More or less than two belts are also possible. However, if only one belt is used the belt should be rather broad. It could, for example, extend over the whole distance between the outer crossbars 21. If more than one belt is used it is not necessary that the gripping and tightening arrangement 7 is located at the same side of the frame for each belt. In addition, it may even be possible to have belts which are not permanently fixed to the frame 1. In this case a further gripping and tightening arrangement or at least a further gripping arrangement would be present at the frame 1 for each belt 5.

The release control signal could be sent to the gripping and tightening arrangements 7 either wirelessly or by a signal wire which could extend from the crane boom to the frame 1. In addition to the release action also the tightening action could be triggered by a remote signal.

Although seats are only present at the outer crossbars in the present embodiment further seats could be present as well. For example, a third seat could be present at the central crossbar 15.

In any case, the rotor hub 29 is mounted to the nacelle of a wind turbine before the wind turbine blades 23 are mounted on the rotor hub. Mounting the rotor hub 29 on the nacelle can either be done before or after mounting the nacelle at the tower top of the wind turbine. When the rotor hub 29 is mounted on the nacelle after mounting the nacelle to the tower top a crane will be used for lifting the rotor hub to the nacelle. This crane may be the same crane which will later be used for mounting the wind turbine blades 23 on the rotor hub 29. In case the rotor hub is mounted on the nacelle before the nacelle is mounted on the tower top the nacelle will be lifted to the tower top by the crane together with the already mounted hub by use of a crane which can later be used for mounting the blade 23 on the rotor hub 29.

The invention claimed is:

1. A wind turbine blade lifting device, comprising:
   a lifting frame having at least one seat arranged to provide lateral support to an upwardly-positioned trailing edge of a wind turbine blade disposed in the lifting frame;
   at least one flexible belt wound affixed to the lifting frame around a downwardly-positioned leading edge of the blade to support an entire weight of the blade; and
   a remotely controllable release mechanism connected between the at least one flexible belt and the lifting frame to release said belt from supporting the weight of the blade and to permit the lifting device to be removably raised from the blade.

2. The wind turbine blade lifting device as claimed in claim 1, wherein the release mechanism comprises a gripping arrangement arranged to grip a first end of said at least one belt at a first side of the frame.

3. The wind turbine blade lifting device as claimed in claim 2, wherein a second end of said at least one belt is directly affixed to a second side of the frame, which is opposite to the first side of the frame.

4. The wind turbine blade lifting device as claimed in claim 2, comprising a further gripping arrangement arranged to grip a second end of said at least one belt at a second side of the frame, which is opposite to the first side of the frame.

5. The wind turbine blade lifting device as claimed in claim 2, wherein the release mechanism further comprises a tightening arrangement to tighten said at least one belt around the leading edge of the blade.

6. The wind turbine blade lifting device as claimed in claim 5, wherein the release mechanism comprises a mechanism to release tightening provided by the tightening arrangement.

7. The wind turbine blade lifting device as claimed in claim 6, wherein the release mechanism comprises a ratcheting device.

8. The wind turbine blade lifting device as claimed in claim 6, further comprising a remote control unit to remotely control release of the tightening provided by the tightening arrangement.

9. The wind turbine blade lifting device as claimed in claim 1, wherein said at least one belt comprises at least two belts spaced apart from one another along a length of the blade to support in combination the entire weight of the blade.

10. The wind turbine blade lifting device as claimed in claim 1, wherein said at least one belt comprises a single belt being sufficiently wide to substantially encompass a length of the blade.

11. A wind turbine blade lifting device, comprising:
    a flexible member wound around a downwardly-positioned leading edge of the blade to support an entire weight of a wind turbine blade; and
    a remotely controllable release mechanism connected to said flexible member to release said flexible member from supporting the weight of the blade.

12. The wind turbine blade lifting device as claimed in claim 11, further comprising a lifting frame having at least one seat to only provide lateral support without lifting support to an upwardly-positioned trailing edge of a wind turbine blade, wherein a release of said flexible member by way of the remotely controllable release mechanism permits the lifting frame to be removably raised from the blade.

13. The wind turbine blade lifting device as claimed in claim 11, wherein the flexible member is selected from the group consisting of at least one belt and at least one strap.

14. A wind turbine blade lifting system, comprising:
a lifting frame having at least one seat to provide lateral support to an upwardly-positioned trailing edge of a wind turbine blade;
at least one flexible member wound around a leading edge of the blade to support an entire weight of the blade; and
a remotely controllable release mechanism connected to said at least one flexible member,
wherein the lifting frame, when connected to a plurality of control wires of a crane boom, is arranged to maintain orientation of the length of the blade in a substantially horizontal position relative to a ground surface when lifted off the ground surface and throughout the lift of the turbine blade, wherein a release of said at least one flexible member by way of the remotely controllable release mechanism permits the lifting frame to be removably raised from the blade.

* * * * *